3,825,508
PRODUCTION OF POLYAMIDE FROM METHYL SUBSTITUTED PHTHALIC ACID BY MELT POLYMERIZATION IN THE PRESENCE OF REDUCING PHOSPHORUS ACID COMPOUND
Takao Ashida and Osamu Kurihara, Iwakuni, Kiyoshi Nawata and Takanori Shinoki, Tokyo, and Yutaka Fujita, Gentaro Yamashita, and Noritsugu Saiki, Iwakuni, Japan, assignors to Teijin Limited, Osaka, Japan
No Drawing. Filed May 4, 1972, Ser. No. 250,244
Int. Cl. C08g 20/20
U.S. Cl. 260—78 R                    6 Claims

ABSTRACT OF THE DISCLOSURE

A melt-polymerized polyamide composition derived from 85 to 100 mol percent in total of a diamine and a methyl-substituted phthalic acid selected from the group consisting of methylterephthalic acid and methylisophthalic acid, 15 to 0 mol percent of a comonomer selected from the group consisting of dicarboxylic acids other than the methyl-substituted phthalic acid, aminocarboxylic acids and lactams thereof, and a reducing phosphorus acid compound.

---

This invention relates to a shapable melt-polymerized polyamide composition having recurring units derived from a methyl-substituted phthalic acid and a diamine, and to a process for its production.

More specifically, the invention relates to a melt-polymerized polyamide composition derived from 85 to 100 mol percent in total of a diamine and a methyl-substituted phthalic acid selected from the group consisting of methylterephthalic acid and methylisophthalic acid, 15 to 0 mol percent of a comonomer selected from the group consisting of dicarboxylic acids other than such methyl-substituted phthalic acid, aminocarboxylic acids and lactams thereof, and a reducing phosphorus acid compound.

The composition of this invention can be fabricated by a customary method into articles such as filaments or films. The methyl-substituted phthalic acids and diamines suffer from a vigorous gellation phenomenon during the polymerization reaction, and cannot practically provide melt-polymerized polyamide compositions which have sufficiently acceptable high molecular weights and can be fabricated into shaped articles such as films or filaments.

The composition can be in the form of powders, granules, or pellets as fabricating material.

Belgian Pat. 766,887 discloses a method of separating methylterephthalic acid and 4-methylisophthalic acid from a mixture of these in increased concentrations, and that a shapable polyamide composition can be formed from the resulting methylterephthalic acid or 4-methylisophthalic acid and a diamine.

The Belgian patent, however, is silent as to whether such a polyamide composition can be formed by melt-polymerization which is industrially advantageous.

A polyamide composition derived from a methyl-substituted phthalic acid and a diamine can be provided, for example, by a method of inter-facial polymerization (for example, British Pat. 871,580), or by a method involving preparing a diphenyl ester of an alkyl-substituted terephthalic acid from the substituted terephthalic and phenol, and polymerizing ester and an aliphatic or aromatic diamine in an organic liquid medium at a temperature not higher than the melting point of the resulting polyamide (U.S. Pat. 3,379,695).

Such a method, however, necessarily suffers from the disadvantages of complicated operation and high cost of production.

Research and development work has shown that the occurrence of gellation is drastic and inevitable in the melt-polymerization of an aromatic dicarboxylic acid having a methyl group and a diamine, and it is practically impossible to obtain a polyamide composition having acceptable high molecular weight. It has now been found that a reducing phosphorus acid compound selected from a variety of phosphorus-containing compounds which have been known to be usable for incorporation in other types of polyamides or present in the polymerization system during the polyamide-forming reaction mentioned above to achieve objects different from those of the present invention is useful in avoiding the occurrence of vigorous gellation which is unavoidable in the melt-polymerization of methylterephthalic acid and/or 4-methylisophthalic acid, and can provide an excellent polyamide composition having a feasible high molecular weight and capable of melt-polymerization which does not involve gellation during fabrication.

As will be shown later by Comparative Examples, this inhibitory action on gellation cannot be achieved by utilizing compounds which are known to be incorporated in other types of polyamides or present in the polyamide-forming reaction system.

Accordingly, an object of this invention is to provide a melt-polymerized polyamide composition having acceptable high molecular weight and melt-shapability by a usual operation, which is derived from methylterephthalic acid and/or 4-methylisophthalic acid and a diamine.

Another object of this invention is to provide a process for producing such a polyamide composition.

Many other objects of this invention along with its advantages will become more apparent from the following description.

The melt-polymerized polyamide composition of this invention is derived from 80–100 mol percent of a methyl-substituted phthalic acid selected from the group consisting of methylterephthalic acid and methylisophthalic acid and a diamine which may contain less than 15 mol percent of a known polyamide-forming third component (i.e., comonomer) containing carboxyl and/or amine groups selected from the group consisting of other dicarboxylic acids, aminocarboxylic acids, or lactams thereof, and a reducing phosphorus acid compound. Usually, the composition contains recurring units derived mainly from the methyl-substituted phthalic acid and diamine, and contains a product of the reducing phosphorus acid compound which is assumed to be converted usually into the form of phosphoric acid and/or organo-phosphoric acid or derivatives of these acids. If the reducing phosphorus acid compound is capable of chemically bonding to the terminal amino group of the resulting polyamide, a part of the compound will be bonded to the ends of the polyamide molecular chain in a manner similar to an end-blocking agent.

Thus, the melt-polymerized polyamide composition of this invention can also be defined as a melt-polymerized polyamide composition having recurring units derived from 85 to 100 mol percent in total of a methyl-substituted phthalic acid selected from the group consisting of methylterephthalic acid and methylisophthalic acid and a diamine and 15 to 0 mol percent of a polyamide-forming comonomer selected from the group consisting of dicarboxylic acids other than the methyl-substituted phthalic acid component, aminocarboxylic acids and lactams thereof, and a product formed under the melt-polymerization conditions from a reducing phosphorus acid compound.

The dicarboxylic acid used to form the melt-polymerized polyamide composition is methylterephthalic acid and/or methylisophthalic acid optionally with another dicarboxylic acid as a comonomer. Methylisophthalic acid has three isomers, 2-methyl isophthalic acid, 4-methylisophthalic acid, and 5-methylisophthalic acid. These methylterephthalic acid and methylisophthalic acids may be used singly or in admixtures.

Examples of the dicarboxylic acids as a comonomer include $C_6$–$C_{12}$ straight chain aliphatic dicarboxylic acids such as adipic acid, azelaic acid, sebacic acid, or dodecandioic acid; aromatic dicarboxylic acids such as terephthalic acid, isophthalic acid, naphthalenedicarboxylic acid, or diphenyldicarboxylic acid; and alicyclic dicarboxylic acids such as hexahydroterephthalic acid, or hexahydroisophthalic acid.

Examples of the other comonomers that can be used in the invention in an amount of less than 15 mol percent together with methylterephthalic acid and/or methylisophthalic acid and the diamine are $C_6$–$C_{12}$ straight chain saturated omega-aminocarboxylic acids such as aminocaproic acid, aminoenanthic acid or aminolauric acid; and lactams of such aminocarboxylic acids, such as caprolactam, ethantholactam, or laurolactam.

Examples of the diamine used to form the melt-polymerized polyamide composition of this invention are $C_4$–$C_{12}$, preferably $C_6$–$C_{12}$, straight chain aliphatic ω, ω′-diamines, aliphatic diamines having a lower alkyl group, preferably an alkyl group having 1 to 4 carbon atoms in the side chain and having 5 to 12, preferably 6 to 12 carbon atoms in the main chain, piperazine, piperazines substituted by an alkyl group, preferably an alkyl group having 1 to 4 carbon atoms, bis-(para-aminocyclohexyl) methane and compounds of the formula

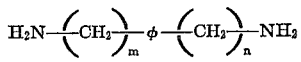

wherein φ is a group selected from the group consisting of m-phenylene, p-phenylene, m-cyclohexylene and p-cyclohexylene groups, m and n are integers of 1 to 3 when φ is a phenylene group, and 0 or integers of 1 to 3 when φ is a cyclohexylene. These diamines can be used either singly or in admixtures.

Specific examples of the diamine component include tetramethylene diamine, pentamethylene diamine, hexamethylene diamine, heptamethylene diamine, octamethylene diamine, nonamethylene diamine, decamethylene diamine, undecamethylene diamine, dodecamethylene diamine, 2-methylpentamethylene diamine, 2-methylhexamethylene diamine, 3-methylhexamethylene diamine, 3-isopropylheptamethylene diamine, 2-methyl-4-ethyl-heptamethylene diamine, 2,4-diethyloctamethylene diamine, piperazine, 2-methylpiperazine, 2,5-dimethylpiperazine, 2-ethylpiperazine, 2,5-diethylpiperazine, 2-isopropylpiperazine, 2-n-butylpiperazine, bis-(para-aminocyclohexyl) methane, metaxylylenediamine, para-xylylenediamine-para-xylylenediamine, 4-aminomethyl, 1-aminoethylbenzene, 1,4-bis(aminopropyl)benzene, m-cyclohexylenediamine, p-cyclohexylenediamine, p-aminomethylcyclohexylamine, p-aminopropylcyclohexylamine, and 1,4-bis(aminopropyl)cyclohexane.

Optional combinations of the diamine component and the methylterephthalic acid and/or methylisophthalic acid optionally containing another component can be used in the present invention, but it is preferred that the combinations be such that the resulting polyamide has a melting temperature of not higher than 320° C. Accordingly, in a preferred embodiment, the melt-polymerized polyamide composition has a melting temperature not higher than 320° C. Furthermore, as a measure of the degree of polymerization, the melt-polymerized polyamide composition of this invention has a reducing viscosity [$\eta_{sp/c}$] (measured at 35° C. in a meta-cresol solution in a concentration of 0.5 g./100 ml.) of 0.7 to 1.6. Preferably, the melt-polymerized polyamide composition of this invention should be completely soluble in formic acid at 80° C. in a concentration of 1 g./100 ml. The solubility of the product as referred to in this invention means this solubility in formic acid.

It is preferred that the reducing phosphorous acid compounds to be present in the polymerization system are selected from phosphorus acids of the following formula

wherein R is a member selected from the group consisting of a hydrogen atom, an alkyl group of 1 to 15 carbon atoms, a cycloalkyl group, an aralkyl group, and an aryl group, m is zero or 1, and m+n is 2; esters thereof, and the salts of the acids.

The acids expressed by formula (1) are specially phosphorous acid, hypophosphorous acid and organo-phosphinic acids. Examples of the organo-phosphinic acid are methylphosphinic acid, ethylphosphinic acid, isobutylphosphinic acid, n-proplyphosphinic acid, isopropyl phosphinic acid, iso-amylphosphinic acid, n-heptylphosphonic acid, n-octylphosphinic acid, benzylphosphinic acid, cyclohexylphosphinic acid, phenylphosphinic acid, 2-methylphenylphosphinic acid, 3-methylphenylphosphinic acid, 4-methylphenylphosphinic acid, 4-ethylphenylphosphinic acid, 2,4-dimethylphenylphosphinic acid, 2,5-dimethylphenylphosphinic acid, 2,4,5-trimethylphenylphosphinic acid, 2,4,6-trimethylphenylphosphinic acid, 4-isopropylphenylphosphinic acid, 4 - phenylphenylphosphinic acid, 4-benzylphenylphosphinic acid, 1-napththylphosphinic acid, and 2-naphthylphosphinic acid.

The esters thereof are $C_1$–$C_{18}$ alkylesters, aralkylesters or arylesters of these acids. Examples of these esters include monoesters such as methyl phosphonic acid, ethyl phosphonic acid, n-propyl phosphonic acid, iso-propyl phosphonic acid, n-butyl phosphonic acid, iso-butyl phosphonic acid, iso-amyl phosphonic acid, n-octyl phosphonic acid, phenyl phosphonic acid, 1-naphthyl phosphonic acid or 2-naphthyl phosphonic acid; diesters such as dimethyl phosphonate, diethyl phosphonate, di(n-propyl) phosphonate, di(n-butyl) phosphonate, di(n-propyl) phosphonate, di(n-butyl) phosphonate, di(iso-butyl) phosphonate, di (iso-amyl) phosphonate, di(neo-pentyl) phosphonate, di (n-hexyl) phosphonate, di(n-heptyl) phosphonate, dibenzyl phosphonate, or diphenyl phosphonate; and triesters such as trimethyl phosphite, triethyl phosphite, tri-(n-propyl) phosphite, tri(iso-propyl) phosphite, tri(n-butyl) phosphite, tri(isobutyl) phosphite, tri(iso-amyl) phosphite, tri(n-octyl) phosphite, triphenylphosphite, tri(4-tert-butyl phenyl) phosphite, tri(2-methylphenyl) phosphite, tri(3-methylphenyl) phosphite, tri(4-methylphenyl) phosphite, tri(1-naphthyl) phosphite, tri(2-naphthyl) phosphite, diphenyl propyl phosphite, diphenyl butyl phosphite, diphenyl 4-tert-butylphenyl phosphite, or phenyl di(4-tert-butylphenyl) phosphite.

The salts of the acids are alkali metal salts of the acids and ammonium salts formed between the acids and ammonia or amines. Specific examples include lithium phosphite-monobasic, lithium phosphite-dibasic, lithium hypophosphite, lithium phenylphosphinate, lithium cyclohexylphosphinate, sodium phosphite-monobasic, sodium phosphite-dibasic, sodium hypophosphite, sodium phenylphosphinate, sodium methylphosphinate, sodium ethylphosphinate, sodium cyclohexylphosphinate, potassium phosphite-monobasic, potassium phosphite-dibasic, potassium hypophosphite, potassium phenylphosphinate, potassium cyclohexylphosphinate, ammonium phosphite- monobasic, ammonium phosphite-dibasic, ammonium hypophosphite, ammonium methylphosphinate, ammonium ethylphosphinate, ammonium cyclohexylphosphinate, ammonium phenylphosphinate, ethylene diammonium phosphite, ethylene diammonium hypophosphite, hexamethylene diammonium phosphite, hexamethylene diammoniumhypophosphite, hexamethylenediammonium ethylphosphinate, hexamethylene diammonium cyclohexylphosphinate, hexamethylene diammonium phenylphosphinate, piperazine diammonium phosphite, piperazine diammonium hypophosphite, or piperazine diammonium phenyl phosphinate.

The melt-polymerized polyamide composition of this invention is obtained by melt-polymerizing 85 to 100 mol percent of a methyl-substituted phthalic acid selected from the group consisting of methyl-terephthalic acid and methyl-isophthalic acid and a diamine and 15 to 0 mol percent of a comonomer selected from the group consisting of dicarboxylic acids other than the methyl-substituted phthalic acids, aminocarboxylic acids, and lactams thereof in the presence of the reducing phosphorus acid compound described above.

It is sufficient that the amount of the reducing phosphorus acid compound is about 0.01 to 5 mol percent based on the recurring unit of the resulting polyamide molecular chain. Preferably, the amount is 0.02 to 4 mol percent, and more preferably, at least 0.03 mol percent and up to 3 mol percent. Since the use of excessively large amounts tends to reduce the degree of polymerization of the resultant polyamide, the amounts within the above-specified range are sufficient unless there is a specific desire for such excessive amounts. On the other hand, if the amount is as small as less than 0.01 mol percent, the gellation cannot be prevented, and therefore, it is recommended that the reducing phosphorus acid compound should be used in an amount of at least about 0.01 mol percent.

The addition of the reducing phosphorus acid compound to the polymerization system can be made at any stage before the last stage of the polymerization. For example, it may be added to the polyamide-forming material, or added at the start of the melt-polymerization. Or it can be added in an initial or intermediate stage of the polymerization reaction. In short, it may be added at any stage before a gellation phenomenon occurs in the melt-polymerization system according to the reaction conditions, the types of the polyamide-forming materials, the type and amount of the reducing phosphorus acid compound, etc. All of the amount required may be added at one time or in portions step by step. It is preferred that the reducing phosphorus acid compound is added before the initiation of the melt-polymerization, at the start of the melt-polymerization, or in a relatively early stage of the polymerization.

Various known polyamide compositions can be incorporated in the polyamide composition of this invention, the examples being a molecular weight regulating agent for polyamides such as acids or amines, stabilizers or antioxidants against heat and/or light, a delustering agent such as titanium dioxide, and various coloring agents.

The melt-polymerized polyamide composition of this invention is a melt-shapable polymer composition ranging from a crystalline polymer suited for fabrication of shaped articles such as filaments and films to amorphous polymers that can be used for making ordinary shaped articles.

For example, a melt-polymerized polyamide composition of good crystallinity can be prepared from about 80 to 100 mol percent of methylterephthalic acid, about 20 to 0 mol percent of methyl isophthalic acid and a $C_6$–$C_{12}$ straight-chain aliphatic $\omega,\omega'$-diamine. On the other hand, an amorphous melt-polymerized polyamide composition can be obtained from less than about 80 mol percent to zero mol percent of methylterephthalic acid, above about 20 mol percent to 100 mol percent of methyl-isophthalic acid and a $C_4$–$C_{12}$ straight-chain aliphatic $\omega,\omega'$-diamine or an aliphatic diamine having alkyl group at the side chain in which the main chain has 5 to 12 carbon atoms.

The melt-polymerization can be performed by any known procedures. Usually, by heating the starting materials under a steam pressure at a temperature of 200 to 260° C., the materials are converted to an involatile composition of relatively low molecular weight, and thereafter, the steam pressure is removed. Preferably, the composition is heated to a temperature above its melting temperature, and then the condensation reaction is caused to proceed.

The melt-polymerized polyamide composition can be in the form of fabricating materials such as powders, granules or pellets, and also in the form of filaments, films, and other general fabricated articles.

When the melt-polymerized polyamide composition of this invention in the form of shaping materials is melt-spun to form filaments, the polyamide composition is transported in the molten state over a considerable distance from the melting part of the melt-spinning apparatus to the head of the spinning nozzle. However, a molten liquid of the polyamide composition of this invention is not gelled. Even when it stays in the dead point area within the apparatus, the molten polyamide liquid does not form gelled particles there. Accordingly, the polyamide composition of this invention can be melt-spun stably on a continuous basis. Furthermore, fibers formed from the composition are free from defects and are of uniform quality.

The invention will be described in greater detail by the following Examples which in no way limit the scope of the present invention. In the Examples, all parts are by weight. The reduced viscosity $\eta_{sp/c}$, as a measure of the degree of polymerization, is a value measured in a m-cresol solution in a concentration of 0.5 g. polymer/100 ml. of the solution at 35° C. In the following examples, the melt-polymerizing reactor is 18 liters in volume and is equipped with a usual anchor style stirrer which is driven by a 1.5 kw. motor.

EXAMPLES 1 TO 12 AND COMPARATIVE EXAMPLES 1 TO 12

Equimolar proportions of methylterephthalic acid and hexamethylene diamine were dissolved in water to form a salt. By addition of ethyl alcohol, hexamethylene diammonium methylterephthalate was obtained as a white powder, which contained one molecule of water of crystallization.

An autoclave equipped with a stirrer was charged with 5,000 parts of hexamethylene diammonium methylterephthalate, 65 parts of stearic acid, and the phosphorus-containing compound shown in Table 1. After replacing the inner atmosphere by nitrogen, the autoclave was closed, and then heated to 260° C. The inner pressure gradually rose with the passage of time, and in 3.5 hours after initiation of heating under stirring, the inner pressure was maintained constant at 15 kg./cm.² G. Immediately, the releasing of the pressure was started, and the heating temperature was raised to 310° C. In the course of about 2 hours, the inner pressure was reduced to 0 kg./cm.² G. Then, nitrogen was passed into the reaction, and heating under stirring was continued at 310° C. For one hour to complete the polymerization. The resulting polymer was extruded into water in the form of a ribbon, and then cut into pellets. The results are shown in Table 1.

For comparison, the foregoing procedure was repeated except that the phosphorus-containing compounds outside the scope of this invention were used.

The resulting pellets were dried to a moisture content of less than 0.01% by weight, and then spun at 315° C. using an extruder-type melt-spinning apparatus (the temperature of the nozzle being 320° C.) The resulting undrawn filaments were drawn to 3 to 4 times the original length using a drawing machine in which a slit heater held at 250° C. was provided between a hot roller at 140° C. and a roller at room temperature. The spinning condition and the properties of the drawn filaments are shown in Table 1.

In Examples 1 to 12, the resulting polyamide compositions had a melting point of 294 to 295° C., and the polyamide composition of this invention in the form of drawn filaments was crystalline polyamide composition having a crystallinity of about 50%.

TABLE 1

| | Phosphorus-containing compound present in the melt-polymerization system | | Melt-polymerized polyamide composition obtained | | | | Properties of the melt-spun filaments | | |
|---|---|---|---|---|---|---|---|---|---|
| | Name | Parts | Gellation during the melt-polymerization | Solubility (as defined in the specification) | $[\eta_{sp}/c]$ (as defined in the specification) | Gellation during melt-spinning | Young's modulus (kg./mm.$^2$) | Tenacity (g./de.) | Elongation (percent) |
| Example | | | | | | | | | |
| 1 | Phosphorus acid | 6.6 | None | Completely and uniformly dissolved. | 1.23 | None | 920 | 6.3 | 15 |
| 2 | Hypophosphorus acid (50 wt. percent aqueous solution). | 21.0 | do | do | 1.18 | do | 800 | 5.5 | 19 |
| 3 | Ethylphosphinic acid | 29.9 | do | do | 1.02 | do | 770 | 4.3 | 21 |
| 4 | Cyclohexylphosphinic acid | 47.1 | do | do | 1.07 | do | 830 | 4.7 | 16 |
| 5 | Phenylphosphinic acid | 45.2 | do | do | 1.06 | do | 730 | 4.8 | 25 |
| 6 | Diphenyl phosphonate | 18.6 | do | do | 1.28 | do | 750 | 5.3 | 28 |
| 7 | Trimethylphosphite | 10.0 | do | do | 1.25 | do | 910 | 5.8 | 16 |
| 8 | Triphenylphosphite | 24.7 | do | do | 1.22 | do | 790 | 5.5 | 23 |
| 9 | Sodium phosphite (dibasic)-pentahydrate. | 17.2 | do | do | 1.09 | do | 650 | 4.2 | 32 |
| 10 | Ammonium hypophoshite | 6.6 | do | do | 1.31 | do | 1,000 | 6.1 | 9 |
| 11 | Potassium phenylphosphinate | 57.3 | do | do | 0.97 | do | 890 | 4.6 | 12 |
| 12 | Hexamethylene diammonium phenyl phosphinate. | 41.1 | do | do | 1.34 | do | 850 | 5.4 | 16 |
| Control | | | In 30 minutes after the initiation of polymerization in a nitrogen flow, stirring became impossible, and the polymerization stopped. | Only swollen, not dissolved. | (¹) | Not spun judging that the melt-spinning would be impossible. | | | |
| Comparative example: | | | | | | | | | |
| 1 | Phosphoric acid | 15.6 | In 35 minutes after the initiation of polymerization in a nitrogen flow stirring became impossible, and the polymerization stopped. | do | (¹) | do | | | |
| 2 | Pyrophosphoric acid | 28.3 | The polymerization could be carried out, but the product could not be taken out from the polymerization reactor in a regular ribbon shape. | Partially dissolved. | (¹) | Immediately after initiation of the spinning, the polymer became unflowable at the extruder portion. | | | |
| 3 | Di(n-octyl)-phosphoric acid | 51.2 | In about 40 minutes after initiation of polymerization under nitrogen flow, the stirring became impossible and the polymerization operation stopped. | Only swollen, not dissolved. | (¹) | The melt-spinning was stopped, judging that it was impossible. | | | |
| 4 | Triphenylphosphate | 51.9 | For the same reason as above, the polymerization operation was stopped in about 45 minutes. | do | (¹) | do | | | |
| 5 | Ammonium phosphate (tri-basic)-trihydrate. | 32.3 | For the same reason as above, the polymerization operation was stopped in about 40 minutes. | do | (¹) | do | | | |
| 6 | Triphenyl phosphine | 83.4 | For the same reason as above, the polymerization was stopped in about 30 minutes. | do | (¹) | do | | | |
| 7 | Sodium phenylphosphonate (dibasic). | 64.2 | For the same reason as above, the polymerization was stopped in about 50 minutes. | do | (¹) | do | | | |
| 8 | (3,5-ditert.butyl-4-hydroxyphenyl)-methylphosphonicacid | 95.2 | For the same reason, the polymerization operation was stopped in about 45 minutes. | do | (¹) | do | | | |
| 9 | Sodium hexametaphosphate | 48.6 | The polymerization operation could be carried out, but the product could not be taken out in a regular ribbon shape. | Almost uniformly dissolved. | 0.72 | Normal operation of the extruder became impossible after initiation of the spinning. | | | |
| 10 | Triphenylphosphine oxide | 88.5 | After the initiation of polymerization under nitrogen flow, the stirring became impossible in about 25 minutes. | Only swollen, not dissolved. | (¹) | Spinning not performed judging that it would be impossible. | | | |
| 11 | Diphenyl phosphinic acid | 69.3 | For the same reason, the polymerization operation was stopped in about 30 minutes. | do | (¹) | do | | | |
| 12 | Hexamethyl phosphoramide | 56.9 | For the same reason as above, the polymerization was stopped in about 35 minutes. | do | (¹) | do | | | |

¹ Not measurable.

COMPARATIVE EXAMPLES 13 TO 15

These Comparative Examples will demonstrate that in the melt polymerization for forming polyamides in which methyl-substituted phthalic acids are not the main component of the recurring unit of the polyamide molecular chain, the problem of gellation is not as serious as in the case of preparing polyamide (Control) from methyl-substituted phthalic acids.

Except using the nylon salts indicated in Table 2 instead of hexamethylene diammonium methyl terephthalate, the same procedure as in Control was repeated, and the polyamide obtained was melt-spun under the same conditions as set forth in Examples 1 to 12. The results obtained are shown in Table 2.

within about 1.5 hours, the inner pressure was reduced to normal atmospheric pressure, and the temperature was raised to what is shown as "polymerization temperature" in Table 3. Subsequently, under a nitrogen stream, the reaction mixture was heated with stirring for 2.0 hours at the "polymerization temperature" to complete the polymerization.

For comparison, the above procedure was repeated except that the reducing phosphorus acid compound was not used (Control).

The results obtained are shown in Table 3.

The melt-polymerized polyamide compositions obtained in Examples 13 to 18 were transparent thermoplastic resins having a cloud point (as measured in accordance with JIS K-6714) of not more than 10, and have great utilitarian value.

TABLE 2

| Comparative Examples | Nylon salts | Melt-polymerized polyamides obtained ||| Gellation during the melt-spinning |
|---|---|---|---|---|---|
| | | Gellation during the melt-polymerization | Solubility | [η$_{sp/c}$] | |
| 13 | Hexamethylene diammonium adipate | None | Completely dissolved uniformly | 1.32 | None. |
| 14 | Hexamethylene diammonium isophthalate | do | do | 1.18 | Do. |
| 15 | A mixture of hexamethylene diammonium adipate (70 mol percent) and hexamethylene diammonium terephthalate (30 mol percent) | do | do | 1.35 | Do. |

EXAMPLES 13 TO 18

5000 parts of each of the nylon salts formed from the predetermined proportions (mol percent based on the total of components I and II) of methyl-substituted phthalic acids and diamines referred to respectively as components I and II in Table 3 below were melt-polymerized in the presence of a predetermined amount of each of the reducing phosphorus acid compounds shown in Table 3. Specifically, these compounds were heated with stirring for 3.0 hours at 220° C. under a steam pressure. Then,

TABLE 3

| Example Nos. | Melt-polymerization system |||||| Melt-polymerized polyamide composition obtained ||||
|---|---|---|---|---|---|---|---|---|---|---|
| | Component I | Mol percent | Component II | Mol percent | Reducing phosphorus acid compound | Amount (parts) | Polymerizational temperature (° C.) | Solubility | η$_{sp/c}$ | Occurrence of gellation during the polymerization | Temp. at which melting begins (° C.) |
| 13 | Hexamethylene diammonium methylterephthalate | 60 | Hexamethylene diammonium 4-methylisophthalate | 40 | Phosphorus acid | 10.0 | 290 | Completely dissolved to form a uniform solution | 1.56 | None | ca. 230 |
| Control | do | 60 | do | 40 | | | 290 | Not dissolved only swollen | (¹) | In 75 minutes after initiation of polymerization, under a nitrogen flow, stirring became impossible, and the polymerization operation was stopped | |
| 14 | do | 20 | do | 80 | Triphenyl phosphite | 35.0 | 270 | Completely dissolved to form a uniform solution | 1.24 | None | ca. 200 |
| Control | do | 20 | do | 80 | | | 270 | Partially dissolved | (¹) | The above polymerization operation could be carried out, but the product could not be withdrawn from the product | |
| 15 | do | 40 | Hexamethylene diammonium 2-methylisophthalate | 60 | Ammonium phosphite (dibasic)-monohydrate | 10.7 | 280 | Completely dissolved to form a uniform solution | 1.09 | None | ca. 220 |
| Control | do | 40 | do | 60 | | | 280 | Not dissolved only swollen | (¹) | In 90 minutes after initiation of polymerization, stirring became impossible, and the polymerization operation was stopped | |
| 16 | do | 50 | Hexamethylene diammonium 5-methylisophthalate | 50 | Hexamethylene diammonium phosphate | 25.0 | 300 | Completely dissolved to form a uniform solution | 1.41 | None | ca. 235 |
| Control | do | 50 | do | 50 | | | 300 | Not dissolved, only swollen | (¹) | In 50 minutes after initiation of polymerization, under a nitrogen flow, stirring became impossible, and the polymerization operation was stopped | |
| 17 | 3-methylhexamethylene diammonium methyl terephthalate | 75 | 3-methylhexamethylene diammonium 4-meth lisophthalate | 25 | Phenylphosphinic acid | 45.2 | 280 | Completely dissolved to form a uniform solution | 1.36 | None | ca. 215 |
| Control | do | 75 | | | | | 280 | Not dissolved, only swollen | (¹) | In 90 minutes after initiation of polymerization, under a nitrogen flow, stirring became impossible, and the polymerization operation was stopped | |
| 18 | do | 60 | 2,5-dimethylhexamethylene diammonium 4-methyl isophthalate | 40 | Hypophosphorous acid | 11.0 | 260 | Completely dissolved to form a uniform solution | 1.28 | None | ca. 190 |
| Control | do | 60 | do | 40 | | | 260 | The insoluble component partly remained | (¹) | The polymerization operation could be carried out, but the product could not be withdrawn in a regular ribbon shape from the polymerization kettle | |

EXAMPLES 19 TO 24

5000 parts of a mixture of each of nylon salts formed from methyl-substituted phthalic acids and diamines shown respectively as components I and II in Table 4 with a predetermined proportion (mol percent based on the total mols of the component I, component II, and the comonomer) of a comonomer not containing a methyl-substituted phthalic acid were melt-polymerized in accordance with Example 1 in the presence of a predetermined part of each of the reducing phosphorus acid compounds shown in Table 4, and 65 parts of stearic acid as a molecular weight regulating agent.

Specifically, these compounds were heated with stirring at 240° C. under a steam pressure for 3.0 hours. Within about 1.5 hours, the inner pressure was reduced to normal atmospheric pressure, and simultaneously, the heating temperature was raised to what is shown as "polymerization temperature" in Table 4. Under a nitrogen stream, the heating of the reaction mixture was continued with stirring for 2.0 hours at the "polymerization temperature," to complete the polymerization.

For comparison, the above procedure was repeated except that the reducing phosphorus acid compound was not used (Control).

The results of the polymerization are shown in Table 4. The resulting polyamide compositions in pellet form were spun in the same way as set forth in Example 1 except using different temperatures. The undrawn filaments obtained were drawn using the same drawing machine as used in Example 1 to make drawn filaments.

The spinning condition and the properties of the drawn filaments obtained are shown in Table 4 also. The "maximum draw ratio," as referred to in Table 4 means the maximum draw ratio which permits smooth drawing without filament breakage. Usually, the greater this value is, the better the drawability is, and the better the properties of the drawn filaments are.

TABLE 4

| Example Nos. | Component I | Mol percent | Component II | Mol percent | Comonomer | Mol percent | Reducing phosphorus acid compound | Amount (parts) | Polymerization temperature (° C.) | Solubility | [η<sub>sp</sub>/c] | Occurrence of gelation during polymerization | Spinning temperature (° C.) | Condition of spinning | Maximum draw ratio | Tenacity (g./de.) | Elongation (percent) | Young's modulus (kg./mm²) | Melting point (° C.) |
|---|---|---|---|---|---|---|---|---|---|---|---|---|---|---|---|---|---|---|---|
| 19 | Hexamethylene diammonium methylterephthalate. | 85 | Hexamethylene diammonium 4-methylisophthalate. | 15 | | | Triphenyl phosphite. | 33.0 | 300 | Completely dissolved to form a uniform solution. | 1.24 | None | 300 | Good | 3.8 | 4.1 | 21 | 750 | 276 |
| Control | do | 85 | do | 15 | | | | | 300 | Not measurable. | | (¹) In about 50 minutes after initiation of polymerization under a nitrogen flow, stirring became impossible, and the polymerization operation was stopped. | | | | | | | |
| 20 | Nonamethylene diammonium methylterephthalate. | 100 | | | | | Phosphorous acid. | 7.7 | 240 | Completely dissolved to form a uniform solution. | 1.08 | None | 240 | Good | 4.8 | 4.0 | 25 | 620 | 207 |
| Control | do | 100 | | | | | | | 240 | Almost dissolved. | 0.87 | The polymerization could be carried out but the product was difficult to withdraw in a regular ribbon shape from the reactor. | 240 | The spun filaments had rubber elasticity, and the spinnability was poor. Hence, the spinning operation had to be interrupted frequently. | 1.7 | 1.3 | 16 | 640 | 192 |
| 21 | Decamethylene diammonium methylterephthalate. | 100 | | | | | Phosphorous acid. | 7.4 | 270 | Completely dissolved to form a uniform solution. | 1.21 | None | 280 | Good | 4.2 | 4.8 | 18 | 650 | 243 |

| | | | | | | | | | |
|---|---|---|---|---|---|---|---|---|---|
| Control | do | 100 | | | 270 | Almost dissolved. | 0.93 | No spinnability, the operation was impossible. | 280 | | | | 233 |
| 22 | Dodecamethylene diammonium methylterephthalate. | 100 | Phosphorous acid. | 6.9 | 260 | Completely dissolved to form a uniform solution. | 1.19 | Good | 270 | 4.5 | 6.5 | 21 | 560 |
| Control | do | 100 | | | 260 | Almost dissolved. | 0.95 | No spinnability, the operation was impossible. | 270 | | | | 238 |
| 23 | Dodecamethylene diammonium methylterephthalate. | 86 | Hexamethylene diammonium methylterephthalate. | 14 | Triphenyl phosphite. | 26.0 | 270 | Completely dissolved to form a uniform solution. | 1.26 | Good | 270 | 4.0 | 4.6 | 19 | 580 |
| Control | do | 86 | do | 14 | | | 270 | Partly dissolved. | (¹) | The polymerization operation could be carried out, but the product could not be withdrawn from the reactor. | | | | |
| 24 | Hexamethylene diammonium methylterephthalate. | 90 | ε-Caprolactam. | 10 | Triphenyl phosphite. | 33.0 | 300 | Completely dissolved to form a uniform solution. | 1.22 | Good | 310 | 4.3 | 5.2 | 16 | 780 |
| Control | do | 90 | do | 10 | | | 300 | Not dissolved, only swollen. | (¹) | In about 45 minutes after initiation of polymerization under a nitrogen flow, stirring became impossible, and the polymerization operation was stopped. | | | | 285 |

¹ Not measurable.

What is claimed is:

1. In a process for producing a film-forming polyamide composition by melt-polymerization of (i) from 85 to 100 mole percent in total of a methyl-substituted phthalic acid selected from the group consisting of methylterephthalic acid and methylisophthalic acid and a diamine selected from the group consisting of $C_4$–$C_{12}$ straight-chain aliphatic, $\omega,\omega'$-diames and aliphatic diamines having $C_1$–$C_4$ alkyl group in the side chains and containing 5 to 12 carbon atoms in the main chain;

(ii) 15 to 0 mole percent of a comonomer selected from the group consisting of dicarboxylic acids other than said methyl-substituted phthalic acid, aminocarboxylic acids and lactams of amino-carboxylic acids; the improvement which comprises the carrying out of the melt-polymerization in the presence of (iii) 0.01 to 5 mole percent based on the recurring units of the polyamide molecular chain of a reducing phosphorus acid compound expressed by the following formula,

wherein, R is a member selected from the group consisting of a hydrogen atom, an alkyl group of 1 to 15 carbon atoms, a cycloalkyl group, an aralkyl group and an aryl group, $m$ is zero or 1, and $m+n$ equals 2, or an ester or salt thereof, wherein said ester is a member selected from the group consisting of $C_1$–$C_{18}$ alkyl esters, aralkyl esters, or aryl esters of said phosphorus acids, and wherein said salt is a member selected from the group consisting of alkali metal salts, ammonium salts and amine salts of said phosphorus acids.

2. The process of claim 1, wherein said methyl-substituted phthalic acid consists of about 80 to 100 mol percent of methylterephthalic acid and about 20 to 0 mol percent of methylisophthalic acid, and said diamine is a $C_6$–$C_{12}$ straight-chain aliphatic $\omega,\omega'$-diamine.

3. The process of claim 1, wherein said methyl-substituted phthalic acid consists of less than about 80 mole to 100 mole percent of methylisophthalic acid.

4. The process of claim 1, wherein said polyamide composition is in the form of powders, granules, pellets, filaments or films.

5. The process of claim 1, wherein said comonomer is a member selected from the group consisting of $C_6$–$C_{12}$ straight-chain aliphatic dicarboxylic acids, aromatic dicarboxylic acids other than the methyl-substituted phthalic acids, alicyclic dicarboxylic acids, $C_6$–$C_{12}$ straight-chain saturated $\omega$-aminocarboxylic acids and lactams of said $\omega$-aminocarboxylic acids.

6. The process of claim 1, wherein said polyamide composition has a reducing viscosity as measured at 35° C. in a meta-cresol solution in a concentration of 0.5 grams/100 millimeters of 0.7 to 1.6.

References Cited

UNITED STATES PATENTS

| | | | |
|---|---|---|---|
| 2,981,715 | 4/1961 | Ben | 260—78 R |
| 3,078,248 | 2/1963 | Ben | 260—78 R |
| 3,080,345 | 3/1963 | Brooks et al. | 260—78 R |
| 3,235,534 | 2/1966 | Brinkman et al. | 260—78 R |
| 3,173,898 | 3/1965 | Sum | 260—78 R |
| 3,365,428 | 1/1968 | Wojciak | 260—78 R |

OTHER REFERENCES

Korshak et al.: Synthetic Hetero-Chain Polyamides, 1962, p. 32.

HAROLD D. ANDERSON, Primary Examiner

U.S. Cl. X.R.

260—78 A, 78 L; 264—176 F